United States Patent [19]

Bulso, Jr. et al.

[11] Patent Number: 5,016,506
[45] Date of Patent: May 21, 1991

[54] METHOD FOR MULTIDIRECTIONAL SHEET FEEDING

[75] Inventors: Joseph D. Bulso, Jr., Canton; William R. Lewers, North Canton, both of Ohio

[73] Assignee: Redicon Corporation, Canton, Ohio

[21] Appl. No.: 526,575

[22] Filed: May 21, 1990

Related U.S. Application Data

[63] Continuation-in-part of Ser. No. 246,772, Sep. 20, 1988, Pat. No. 4,926,724.

[51] Int. Cl.$^5$ .............................................. B65H 5/16
[52] U.S. Cl. .................................... 83/35; 83/55; 83/251; 83/268; 83/414; 198/468.2; 271/269
[58] Field of Search .................. 83/35, 55, 22, 32, 71, 83/74, 251, 268, 367, 409, 277, 936, 414; 271/10, 14, 233, 267, 269; 198/461, 468.2

[56] References Cited

U.S. PATENT DOCUMENTS

| | | | |
|---|---|---|---|
| 2,480,192 | 8/1949 | Laxo | 113/113 |
| 3,034,783 | 5/1962 | Christa | 271/14 |
| 3,073,593 | 1/1963 | Bauer | 271/60 |
| 3,312,463 | 4/1967 | Hoose et al. | 271/10 |
| 3,446,499 | 5/1969 | Ringler | 271/54 |
| 3,765,284 | 10/1973 | Maiorino | 83/71 |
| 3,980,297 | 9/1976 | Bulso, Jr. et al. | 271/269 |
| 4,049,261 | 9/1977 | Franek et al. | 271/269 |
| 4,058,307 | 11/1977 | Bubley et al. | 271/85 |
| 4,144,783 | 3/1979 | Yamazaki et al. | 83/216 |
| 4,242,800 | 1/1981 | Werber | 33/14 |
| 4,306,596 | 12/1981 | Kreibaum | 144/3 R |
| 4,382,395 | 5/1983 | Haar | 83/71 |
| 4,691,817 | 9/1987 | Haar | 198/468.2 |
| 4,708,573 | 11/1987 | Hug | 414/589 |

FOREIGN PATENT DOCUMENTS

| | | |
|---|---|---|
| 2640379 | 5/1978 | Fed. Rep. of Germany . |
| 8318202.0 | 10/1983 | Fed. Rep. of Germany . |
| 8318201.2 | 11/1983 | Fed. Rep. of Germany . |

Primary Examiner—Frank T. Yost
Assistant Examiner—Scott A. Smith
Attorney, Agent, or Firm—Reese Taylor

[57] ABSTRACT

A multidirectional sheet feeding apparatus includes a sheet loader and a sheet feeder disposed adjacent a press. Both the feeder and loader include carriages movable toward and away from the press and carriages movable laterally with respect to the direction of feed toward and away from the press. The method of operation includes feeding a sheet from the loader to the feeder and from the feeder into the press a predetermined distance. The method further includes feeding the sheet further into the press and/or laterally thereof as required between press cycles. In a variation of the method, the sheet may be moved both further into the press and laterally thereof simultaneously. The method further includes aligning the loader with the feeder prior to the last operation of the press on a sheet.

3 Claims, 8 Drawing Sheets

METHOD FOR MULTIDIRECTIONAL SHEET FEEDING

RELATED PATENT APPLICATIONS

This application is a continuation-in-part of applicants' earlier filed application Ser. No. 246,772 filed Sept. 20, 1988 now U.S. Pat. No. 4,926,724.

BACKGROUND OF THE INVENTION

This invention relates in general to the feeding of sheets of material into a press or other apparatus so that operations can be performed thereon. The invention relates in particular to a method and apparatus for feeding sheets into a reciprocating press in two feed directions disposed perpendicularly to each other so that the sheet can alternately be moved in first and second directions.

In general, the object of the invention is to achieve maximum utilization of the sheet of material and maximum efficiency of operation of the press by progressively positioning the sheet so as to consume it as nearly completely as possible while avoiding empty or idle cycles of the press.

DESCRIPTION OF THE PRIOR ART

The present invention will be illustrated and described in connection with the blanking of container ends for two or three piece containers, but it should be understood that the invention has a utility in any situation in which it is desired to index a sheet of material into a press or other apparatus in more than one direction, alternately.

In the can making industry, large volumes are normally required. Therefore, the presses are normally equipped with multiple tooling stations so that, upon each cycle of the press, multiple blanks, for example, may be struck from a sheet of material. This arrangement facilitates high volume operation and results in little or no waste.

It is often the case, however, that relatively small volumes are required and, therefore, as illustrated in this application by way of example, often as few as two sets of tooling are employed in a given press. This results, of course, in considerable financial savings due to reduced press and tooling costs, but the difficulty usually encountered is that the sheet material received from the mills, commonly either aluminum or steel, comes in certain predetermined sizes. In other words, the sheets have a fixed width and, while it is, of course, always possible to specially mill different widths, the cost is prohibitive, particularly when it is considered that a relatively low volume operation is contemplated. Therefore, the problem becomes one of taking a standard width sheet and utilizing it with a press having, for example, two sets of tooling without either undue waste of material or inefficient operation due to the necessity of having the press cycle through empty or idle strokes.

There are quite a number of prior art patents dealing with feeding of sheets into presses. Examples can be seen in Bulso U.S. Pat. No. 3,980,297; Laxo U.S. Pat. No. 2,480,192; Christa U.S. Pat. No. 3,034,783; Bauer U.S. Pat. No. 3,073,593; Ringler U.S. Pat. No. 3,446,499; Werber U.S. Pat. No. 4,242,800; and Hug U.S. Pat. No. 4,708,573. Essentially, however, this prior art discloses various means for taking a single sheet from a stack of sheets and inserting it into the press in the normal direction or axis of feed which will be consistently described herein as the X axis. None of this art appears to disclose means, however, for not only taking a sheet of material from a stack of sheets and advancing it in timed relationship into the press along the X axis, but also alternately or selectively advancing it along a Y axis which is considered to be normal or perpendicular to the X axis.

There are several patents to Haar which illustrate means for shifting sheets in an X and a Y direction, but these patents do not appear to disclose apparatus or method wherein this shifting can be done when the sheet has actually been inserted into the press.

These patents include Haar U.S. Pat. Nos. 4,382,395 and 4,691,817 and German Utility Models Nos. G8318202.0 and G8318201.2. Also of interest is German Pat. No. 2,640,379 which utilizes a magnetic band to shift the sheets. Therefore, while, according to the Haar teachings, the sheets can be shifted not only in the X but in the Y direction, idle hits are still encountered because of the fact that this cannot be accomplished in the press itself.

While the above-noted prior art is presumably satisfactory for the purposes for which it is intended, it is believed that further improvements can be made in the sheet feeding art by providing means for feeding the sheets without the assistance of any gripping means or magnetic means while avoiding idle hits while transferring the sheet.

SUMMARY OF THE INVENTION

It has, therefore, been found that an improved method and apparatus for multidirectional sheet feeding can be developed wherein an electronically controlled servo actuated loader and a similar feeder are associated with the press. It has been found that the feeder can be located immediately adjacent the press and can be designed so as to have a servo driven carriage which moves in an X direction or, in other words, toward and away from the press along the normal feed axis. This carriage can also be provided with appropriate servo drive means so that it can also move in a Y direction or in a direction perpendicular to the X direction. In this fashion, the feeder can insert a sheet into the press, permit one press operation, shift the sheet in a direction normal to the direction of feed, permit another press operation and then either shift again in a Y direction, depending upon the width of the sheet and the tooling, or further in the X direction, following which the entire operation is repeated until the press tooling has exhausted the sheet of material.

It has also been found that associated in series alignment with the feeder just described can be a loader similarly bearing a carriage or frame which is shiftable in both X and Y directions and that, by means of computer control of the servo drive means, this carriage can be brought into alignment with the carriage of the feeder so that, as the press is about to begin its final operation on a first sheet, a second sheet can be injected onto the feeder by moving the carriage of the loader in the X direction.

It has also been found that the loader and feeder can be constructed of lightweight, simplified structure so as to realize energy savings and without complicated gripping means so as to realize construction and maintenance savings.

Finally, it has been found that even greater press speeds can be accommodated by synchronizing the servo drives so that movement in the X and Y directions can be accomplished in one motion or simultaneously to effectively move the sheet at an angle with respect to the X and Y directions when indexing from one row to the next.

Accordingly, production of an improved method and apparatus for feeding sheets of material into a press becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
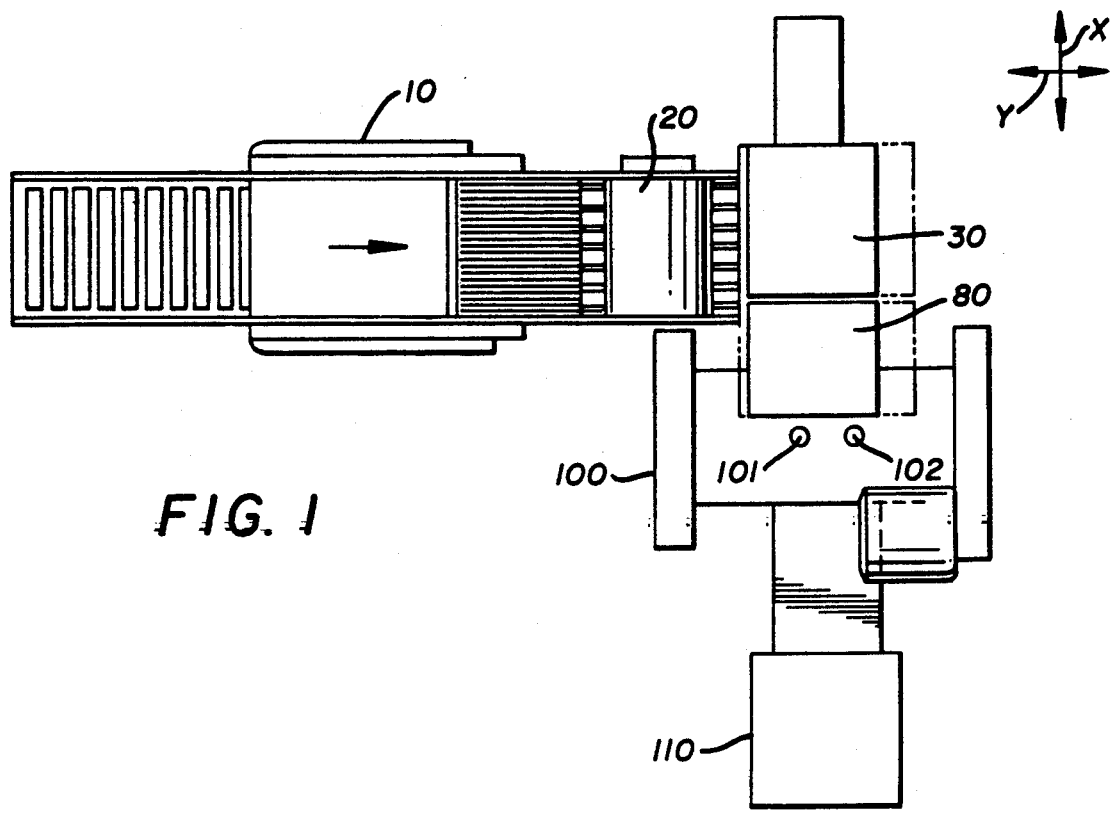
FIG. 1 is a schematic plan view of the overall arrangement of the press and the sheet feeding apparatus.
Figure 2:
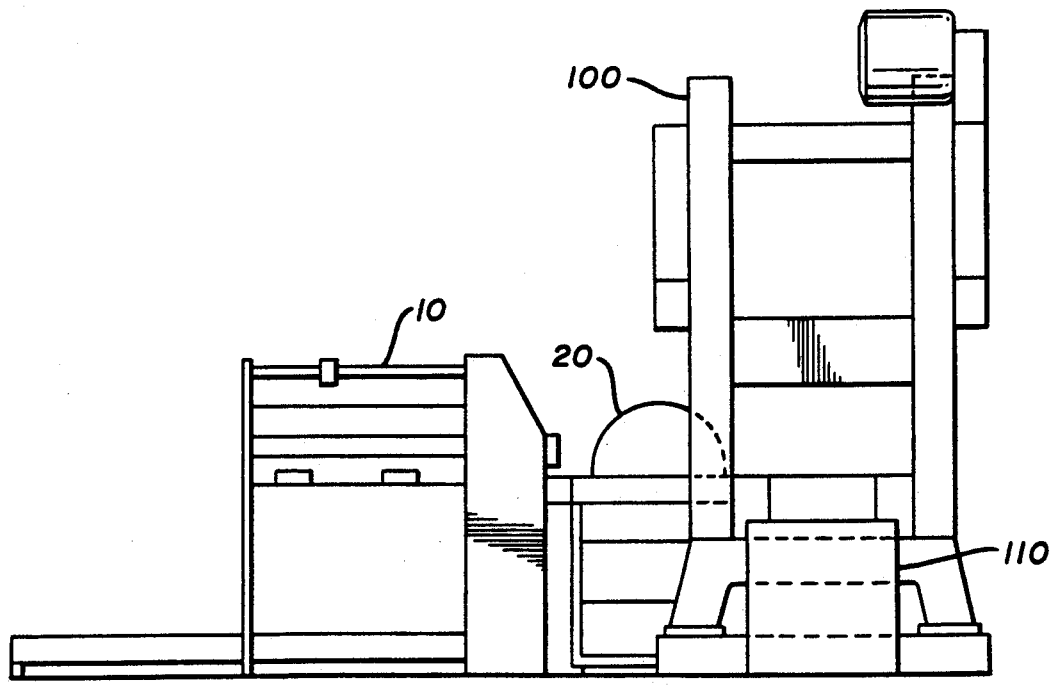
FIG. 2 is an elevational view of the schematic layout of FIG. 1.

Referring first to FIGS. 1 and 2 of the drawings, it will be seen that the overall arrangement of the production line generally consists of a destacker 10 associated with a waxer 20 so that the sheets can be removed from the pallet or other carrying means by the destacker, separated individually and moved into the waxer 20. It will, of course, be understood that the waxer 20 is somewhat optional and its employment depends upon the end use of the material. It is illustrated here, however, since essentially the operation which will be described by way of example will consist of blanking blanks or discs for use in the formation of can ends from a sheet of material.

Associated with the waxer 20 is a loader 30 and associated with the loader 30 is a feeder 80 which is located closely adjacent the press 100. The press 100 illustrated in FIG. 1, for example, is a reciprocating press having one or more tool carrying slides movable toward and away from a fixed base and is shown schematically as having two tooling stations 101 and 102. A scrap box and scrap conveyor 110 are also illustrated, with it being understood that the destacker 10, waxer 20, press 100 and scrap box and conveyor 110 are essentially conventional in structure and operation.

Figure 3:
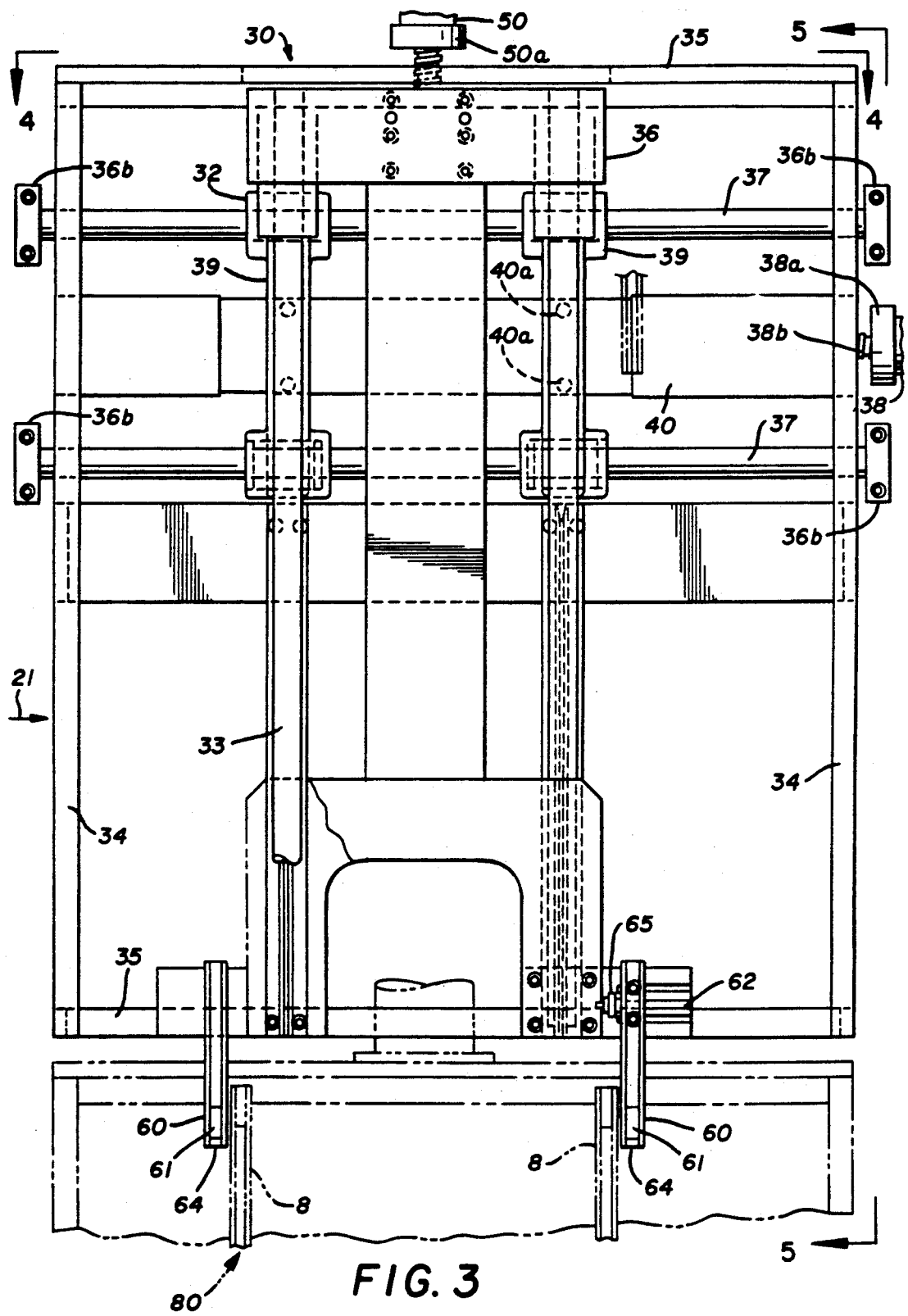
FIG. 3 is a plan view of the loader apparatus.
Figure 4:
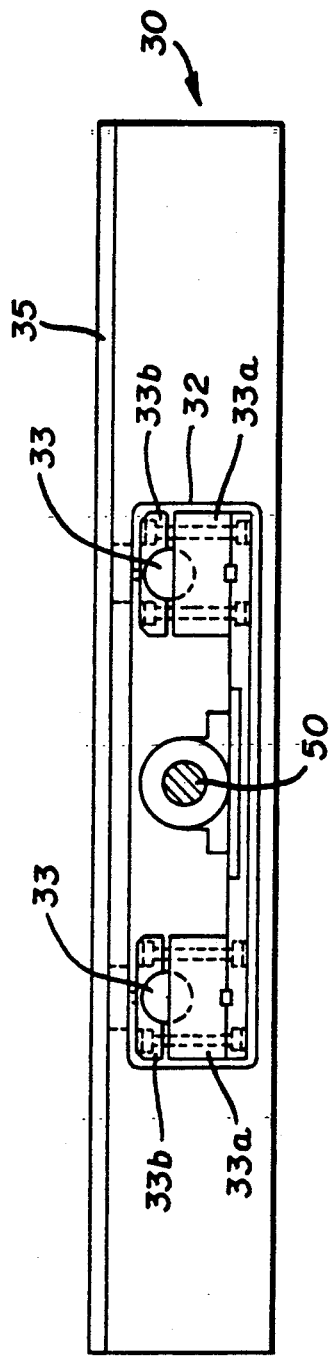
FIG. 4 is an elevational view taken along the line 4—4 of FIG. 3.
Figure 5:
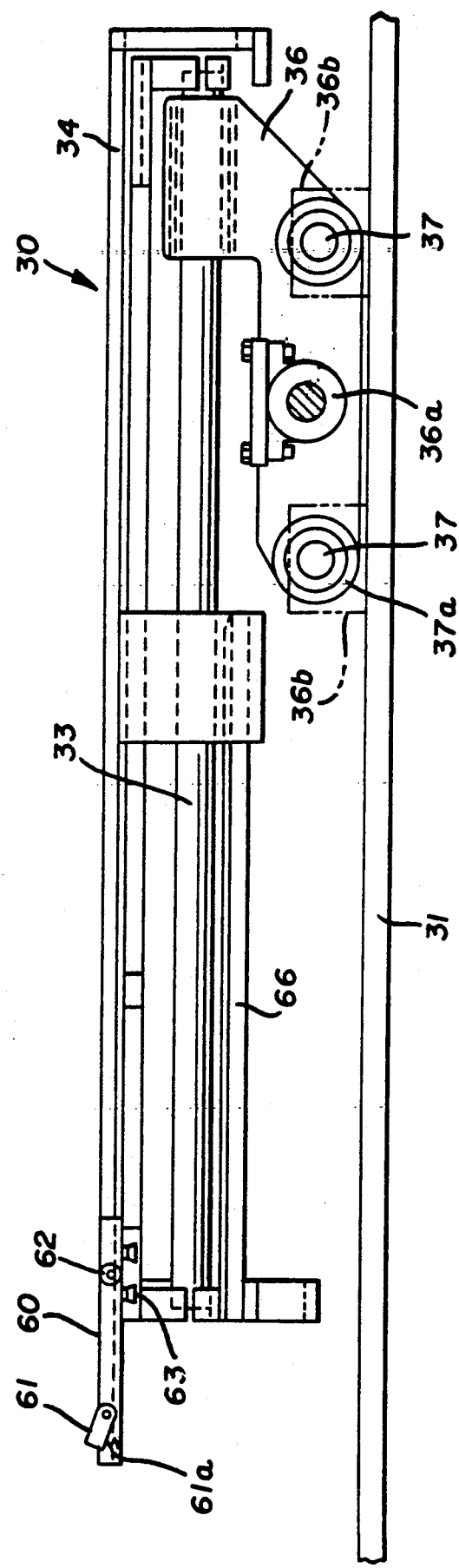
FIG. 5 is an elevational view taken along the line 5—5 of FIG. 3.

Reference will next be had to FIG. 3 of the drawings for a detailed description of the loader apparatus 30.

It will first be noted that the direction of feed from the waxer 20 onto the loader apparatus 30 is in the direction of the arrow 21 illustrated in FIG. 3 of the drawings and it will also be noted that the scrolled sheet is positioned along the X axis rotated 90° from the usual orientation of scrolled stock (see FIGS. 6 and 8 through 12). It will also be noted that the sheets illustrated herein are in the form usually referred to as "scrolled" in the industry, but the invention would have equal utility with plain rectangular sheets.

The loader 30 primarily consists of opposed side frame members 34,34 and opposed end frame members 35,35 so as to form an essentially box-like arrangement which is capable of receiving on its surface the sheet of material (not shown in FIG. 3).

This entire loader assembly is mounted on a base 31 and includes a carriage plate 39 which is movable in the X axis. Parallel rods 33,33 run lengthwise of the loader 30, again with their axes lying in what has been referred to as the X axis of movement or the normal direction of feed into press 100. These rods 33,33 are supported by rod holders 33a,33a and rod caps 33b,33b. The framework, which includes the bracket 36 and the carriage plate 39 is movable, as noted, in the X axis along the rods 33,33. This movement is accomplished by an X axis servo which is secured to an X axis servo plate 50a and a ball screw 51. In this fashion, actuation of the servo 50 will turn the ball screw and move the entire carriage assembly in the X axis direction toward the feeder 80 and the press 100, i.e., to the bottom of FIG. 3 of the drawings. Of course, reverse rotation of the servo and the screw 51 will pull the carriage assembly away from the press.

It ought to be noted with regard to the X axis carriage that parallel finger holders 60 project from the end of the carriage closest to the press 100 and the feeder 80. These include finger feeds 61,61 which are supported by a springs 61a,61a, an adjustment screw 62 and an adjustment nut 63 carried on adjustment plate 64. This makes it possible to accommodate different widths of stock which is accomplished by movement of adjustment collar 65. It will also be noted that finger feeds 61,61 do not actually grip the plate, but would simply engage the trailing edge thereof so as to insure that the sheet moves with plate 39. A loader rest bar 66 is also provided for strength and rigidity purposes.

For Y axis movement, it will be noted that parallel rods 37,37 are mounted on support brackets 36b,36b and that a second servo 38 and servo plate 38a are connected to a ball screw 38c. This ball screw 38c is secured to a Y axis plate 35 which is movable in the Y direction or, in other words, in a direction normal to the previously described movement along the rods 33,33.

Operation of the loader 30 generally includes movement of a sheet from the waxer 20 in the direction of the arrow 21 until that sheet is deposited on top of the frame formed by the side frame members 34,34 and end frame members 35,35. When it is then desired to advance the sheet in the X direction or, in other words, toward the feeder 80 and press 100, the servo 50 is activated to drive the screw 51 and the framework associated therewith along rods 33,33. When it is desired, for purposes which will be described below, to shift the sheet in the Y axis on the loader, it is simply necessary to activate the servo 38 which will drive the screw 38c and the plate 35 in the Y axis direction. In this fashion, the sheet can be aligned with the feeder and moved onto the feeder, as will be described below.

Figure 6:
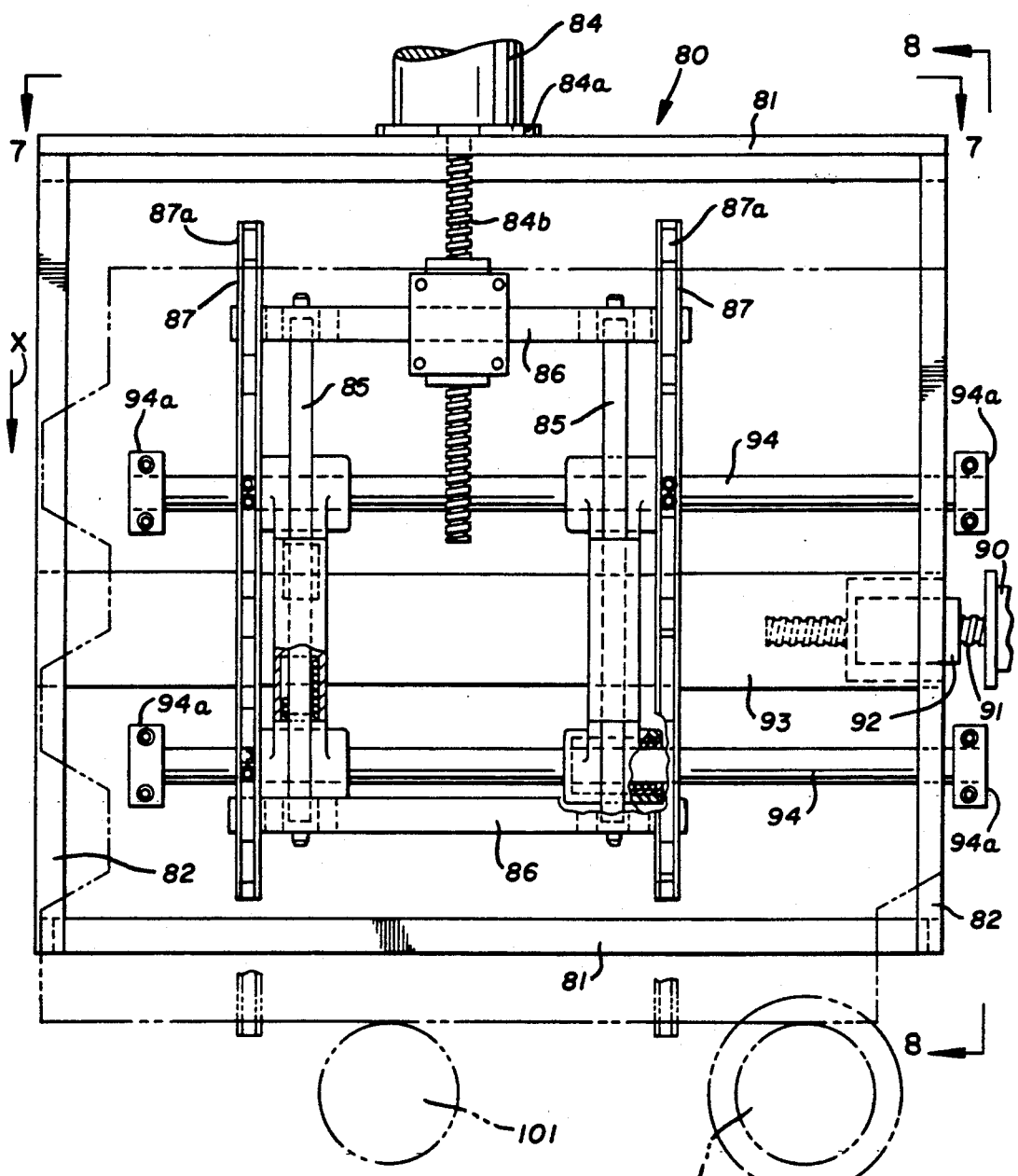
FIG. 6 is a plan view of the feeder appartus of the present invention.
Figure 7:
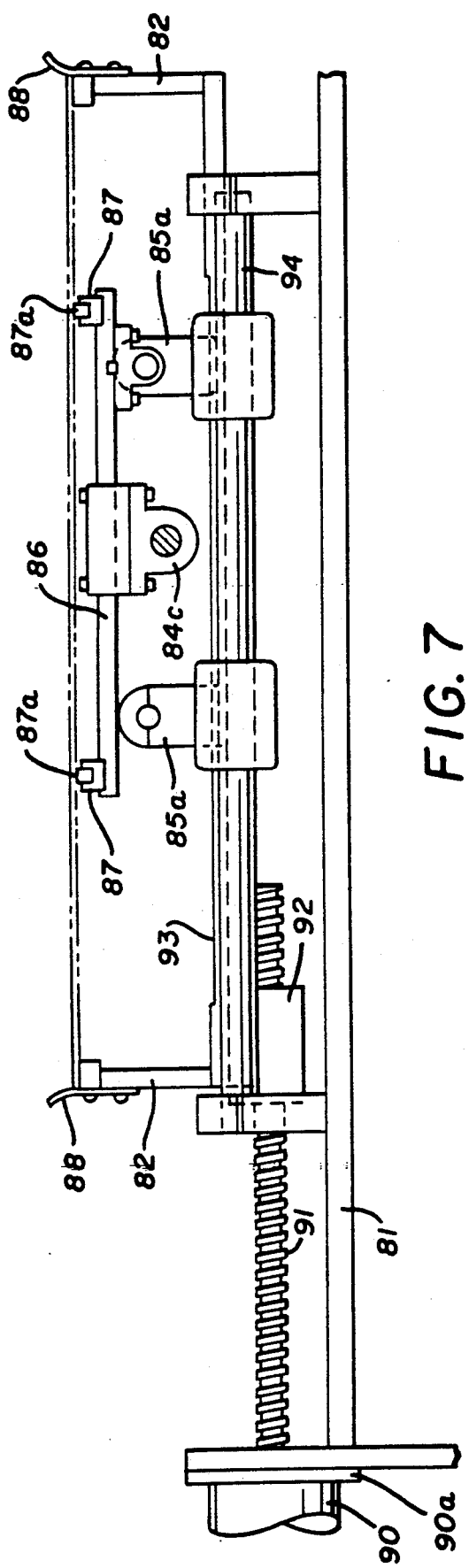
FIG. 7 is an elevational view taken along the line 7—7 of FIG. 6.
Figure 8:
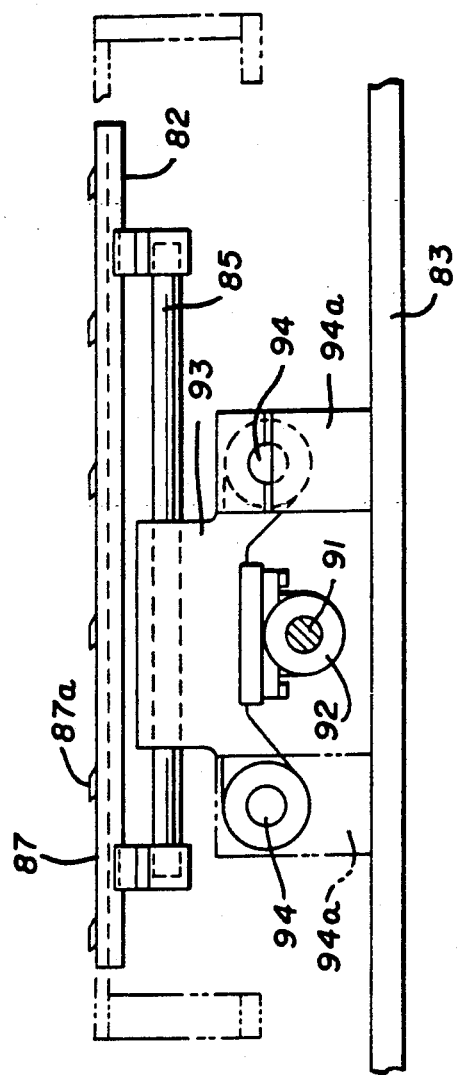
FIG. 8 is an elevational view taken along the line 8—8 of FIG. 6.
Figure 9:
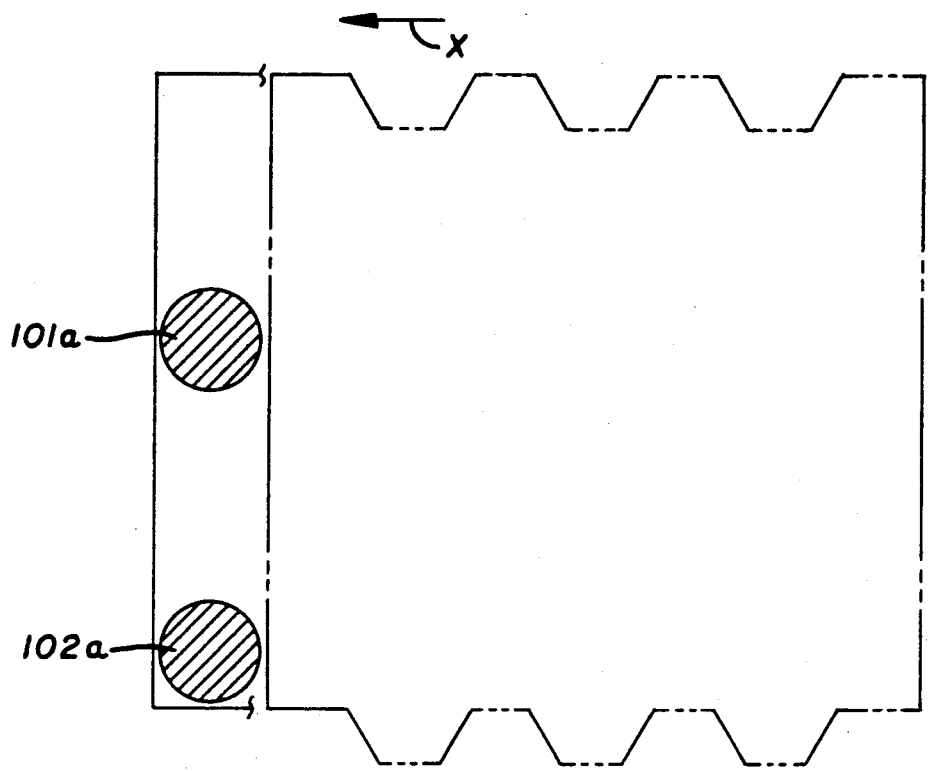
FIGS. 9 through 12 are shematic views showing a scrolled sheet of material and schematically illustrating, first, movement along the X axis, second, movement along the Y axis, third, movement still further along the Y axis and, finally, movement again along the X axis.

Turning then to FIGS. 6 through 8 for a description of the feeder 80, it will be noted first from FIG. 1 that the feeder is located in end-to-end relationship with the loader 30 along the X axis and closely adjacent press 100. Actually, FIG. 3 also illustrates a part of the feeder mechanism associated with the loader in broken lines to further illustrate its orientation.

The feeder 80 includes opposed end frame members 81,81 and opposed side frame members 82,82 so as to form a box-like frame. A base plate 83 supports the structure and, as noted earlier, the feeder is associated closely with the press 100.

An X axis servo 84 is carried by the feeder and connected to a servo plate 84a, a ball screw 84b and a ball nut 84c. The ball nut 84c connects with one of braces 86,86 which are, in turn, carried on rods 85,85 extending in the X axis direction. These rods are supported by rod holders 85a,85a.

Also carried on the frame braces 86,86 are finger bars 87,87 which carry a plurality of spring loaded fingers 87a,87a of the type already described with regard to the fingers 61,61 of the loader 30.

It will be apparent that upon actuation of the servo 84, the screw 84b will be turned and the framework will be moved in the X axis direction or, in other words, toward the press 100.

To obtain Y axis movement of the feeder, it will be noted that a Y axis servo 90 is associated with a servo plate 90a and the appropriate screw 91 and ball nut 92. This structure is associated with the Y axis plate 93 which is movable along the parallel Y axis rods 94,94 which are, in turn, supported by the rod holders 94a,94a.

The Y axis plate 93 also carries projections 82,82 which form the side frames and these projections have guide plates 88,88 which serve to locate the sheet laterally.

It should be apparent from the foregoing that if it is desired to move the carriage of the feeder in the X axis direction, it would simply be necessary to actuate the servo 84 which will, in turn, rotate the screw 84b and move the carriage in that direction. Reversing the servo will, of course, pull the carriage back in the X axis direction away from the press.

Y action movement is similarly accomplished by actuation of servo 90, turning the screw 91 and moving the plate 93 and its associated apparatus in the Y axis direction.

Operation of the improved sheet feeder assembly will be described essentially beginning with the movement of a sheet from the waxer 20 to the loader 30. Operation of the destacker and waxer are not believed overly pertinent in view of the fact that these are conventional apparatus and will not be described herein.

In any event, assuming that a sheet has been processed by the waxer, it will then be moved from the waxer onto the loader 30. Assuming this to be the first sheet and the carriages of the feeder and loader are in Y axis alignment, all that is required is to index the loader 30 in the X direction by actuating servo 50 and deposit the first sheet onto the feeder 80. The X axis stroke of the feeder 30 will have been calculated so that the trailing edge of the sheet will be positioned slightly ahead of the rearmost fingers 87a,87a of loader 80. Additionally, it will be seen (see FIG. 3) that finger bars 60,60 of loader 30 are offset with respect to finger bars 87,87 of feeder 80 so as to avoid interference therebetween.

It ought also be noted that the finger bars of the loader 30 are illustrated in full lines in FIG. 3 in the forward position, i.e., where they would be upon delivery of a sheet to the feeder. One such bar is shown in broken lines in the retracted or sheet receiving position.

Figure 10:
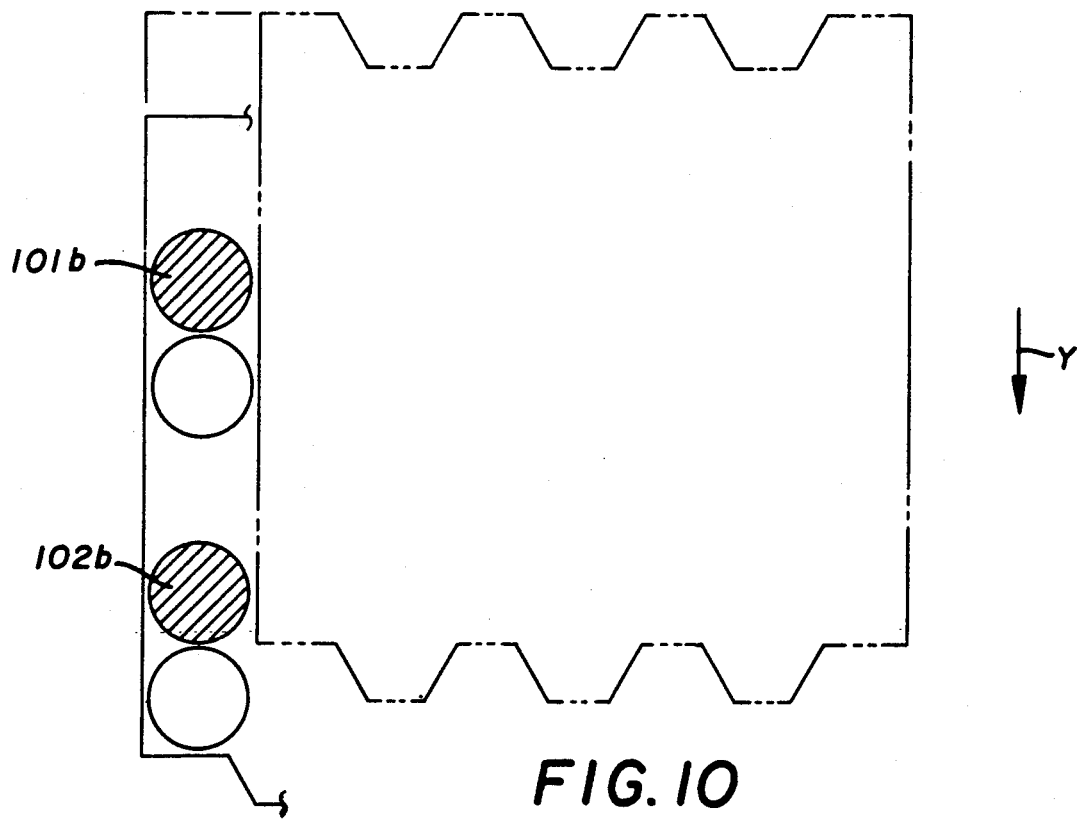

Actuation of the feeder 80 in the X direction will then, of course, insert the sheet into the press. As previously noted, the press which is illustrated herein by way of example has two tooling stations 101 and 102 and actuation of the press will blank two blanks 101a and 102a, as shown schematically in FIG. 9 by the cross-hatched circles. In order to blank the second set of blanks 101b and 102b, the sheet is then indexed in the Y direction, as shown in FIG. 10, and subsequent incremental movements in the X and Y direction can clearly be seen in FIGS. 11 and 12 of the drawings to blank blanks 101c,101d,102c,102d. To avoid unnecessary length, only the first four cycles of the press have been illustrated, but it should be readily apparent that repetition of the X and Y movement, as required by the number of tooling stations and the width of the sheet, will result finally in the press reaching a point where it is ready to blank the last two available blanks in the sheet.

At this time, it will be assumed that a second sheet has been loaded onto the loader from the waxer 20 and the computer which controls the servos 38, 50, 84 and 90 will sense, by a predetermined program, that the press has completed the necessary number of cycles so that, upon one additional cycle, it will have used up the first sheet and will be ready to receive a new sheet.

At that time, the loader 30, which will have previously received a new sheet from the waxer, will be indexed in the Y direction until such time as it is in alignment with the sheet which is supported in the press 100 and on the feeder 80, along the X axis. At that point, simultaneously, the press 100 will cycle and blank the last blank and the normal press ejector will eject the scrap from the press to scrap box 110 as the press opens. The loader 30 will simultaneously deposit a second sheet onto the feeder 80 which will engage that sheet with the endmost fingers 87a,87a (the fingers furthest away from the press), index in the X direction and present the leading edge of the next sheet ready for operation as the press closes again. It will be noted that this avoids any idle cycle of the press 100 since a sheet will always be present.

Once this has been done, the loader carriage indexes back to the position illustrated in FIG. 3 which is the receiving position and is ready to receive another sheet from the waxer 20.

The feeder carriage operates slightly differently from the loader carriage in that once the feeder carriage has inserted a sheet in the X direction, the finger bars 87,87 are retracted all the way back to the starting position. As can be seen in FIG. 8 of the drawings, there are a plurality of fingers 87a,87a on each finger bar 87. Keeping in mind that the sheet will have been inserted into the press a distance approximately the diameter of one of the tools, the next time X axis movement is required of the feeder 80, the second next innermost fingers 87a,87a will engage the end of the sheet and shove it further into the press along the X axis. The finger bars then retract again all the way to the starting point and this is repeated until, of course, the rear edge of the sheet passes all the way into the press. Operating the finger bars 87,87 in this fashion makes it possible for them to be retracted all the way to the rear for receipt of the next succeeding sheet from loader 30 without any lost motion.

It is also possible to accommodate even greater press speeds by timing the feeder servo drives 84 and 90 so that movement at an angle with respect to the X and Y directions can be accomplished. Effectively, this results in movement in both directions simultaneously and is particularly advantageous when moving from one row to the next.

Figure 11:
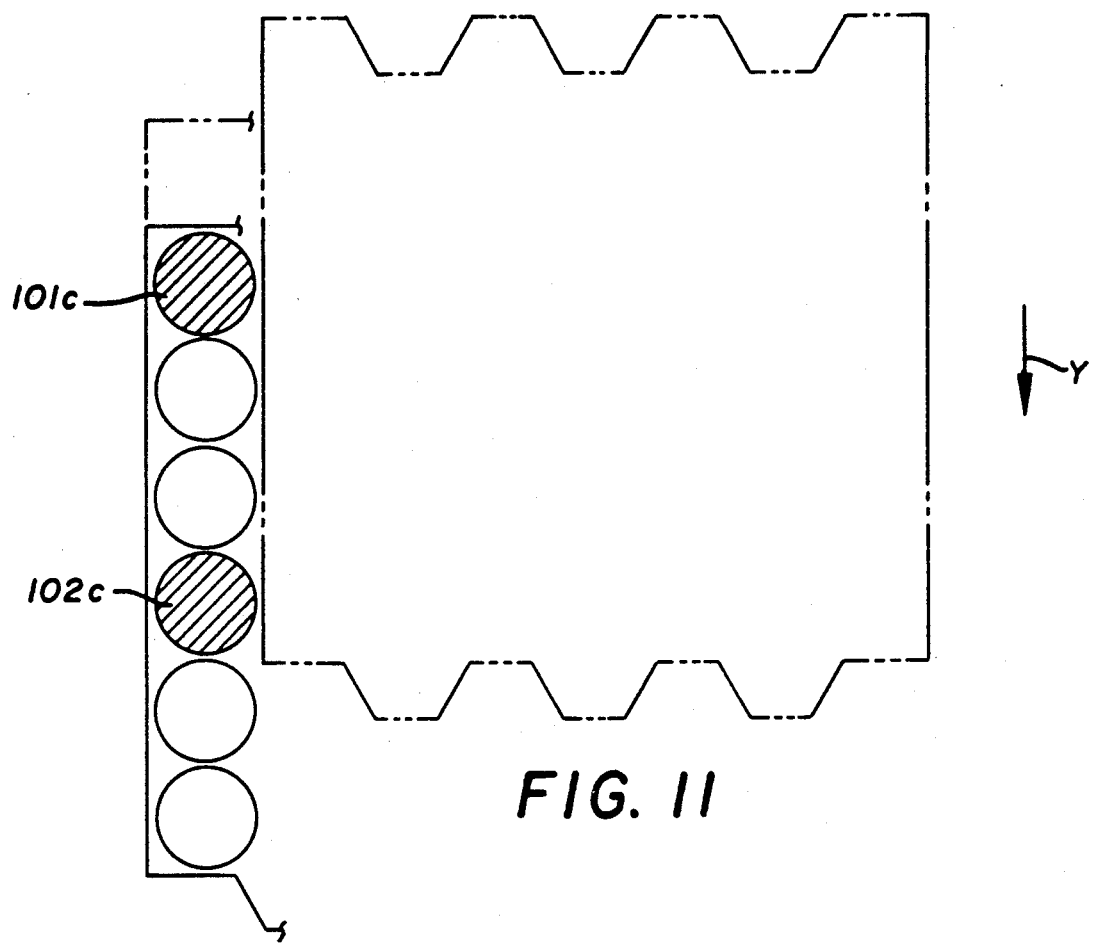
Figure 12:
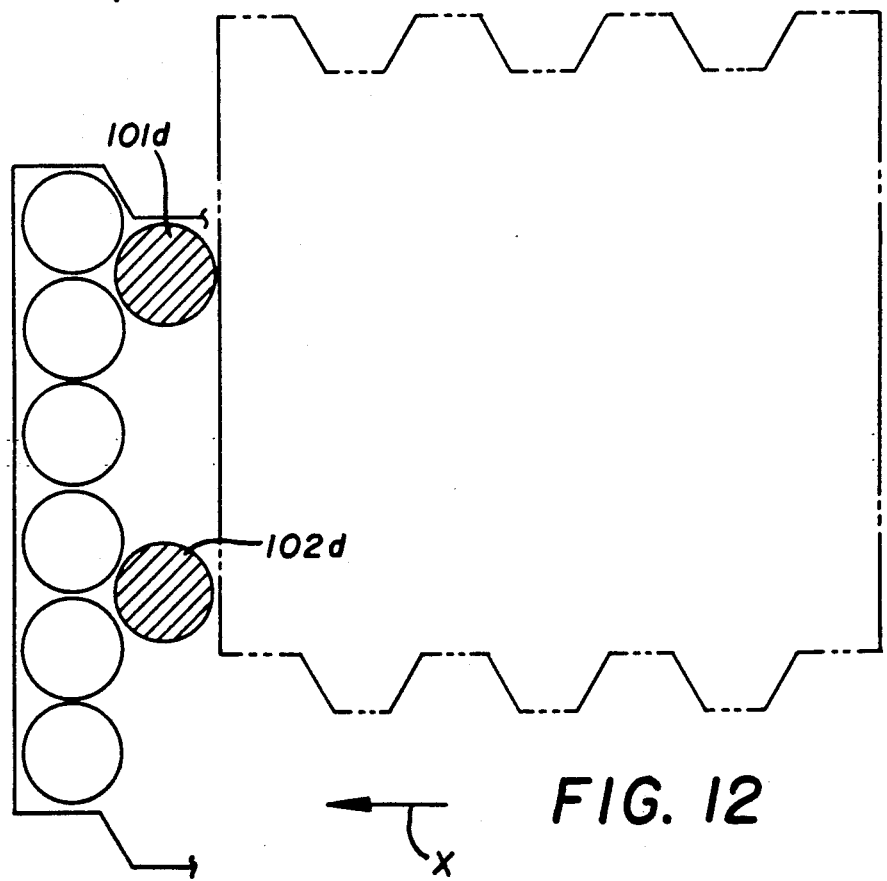
Figure 13:
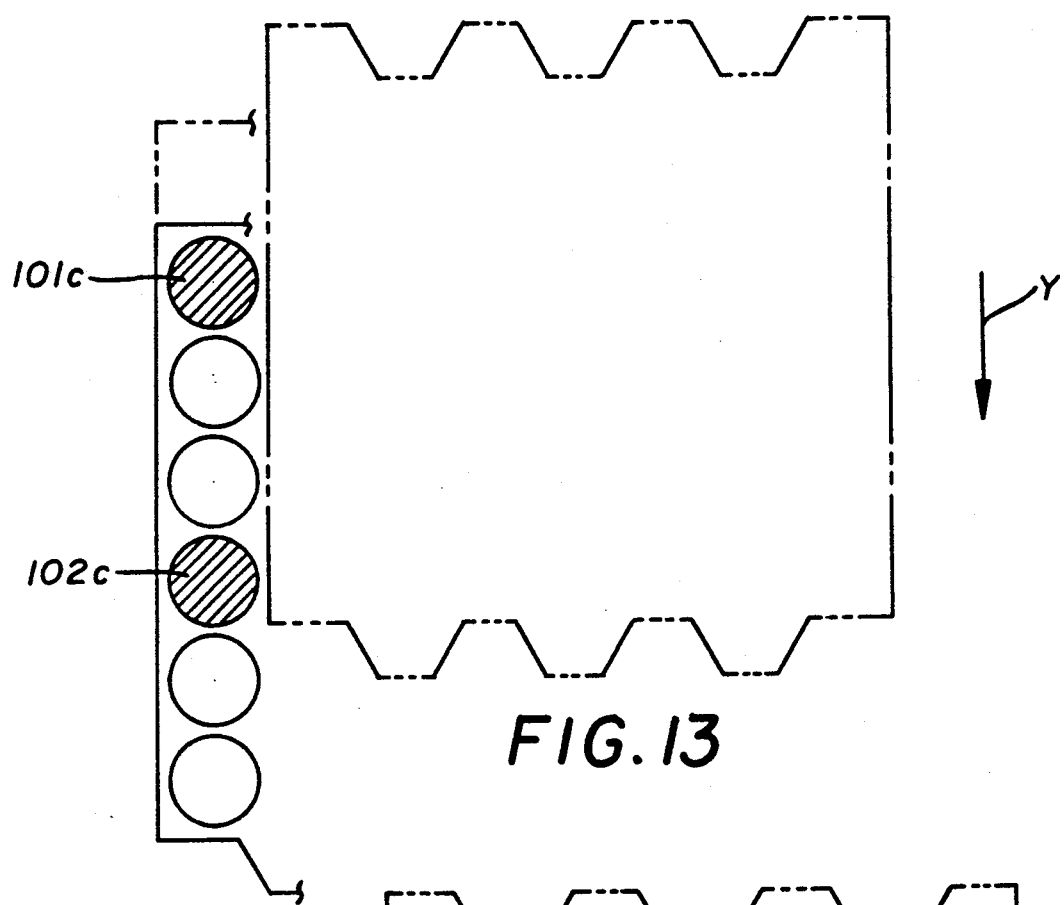
FIGS. 13 and 14 are schematic views similar to FIGS. 9 through 12 showing a modified movement path.
Figure 14:
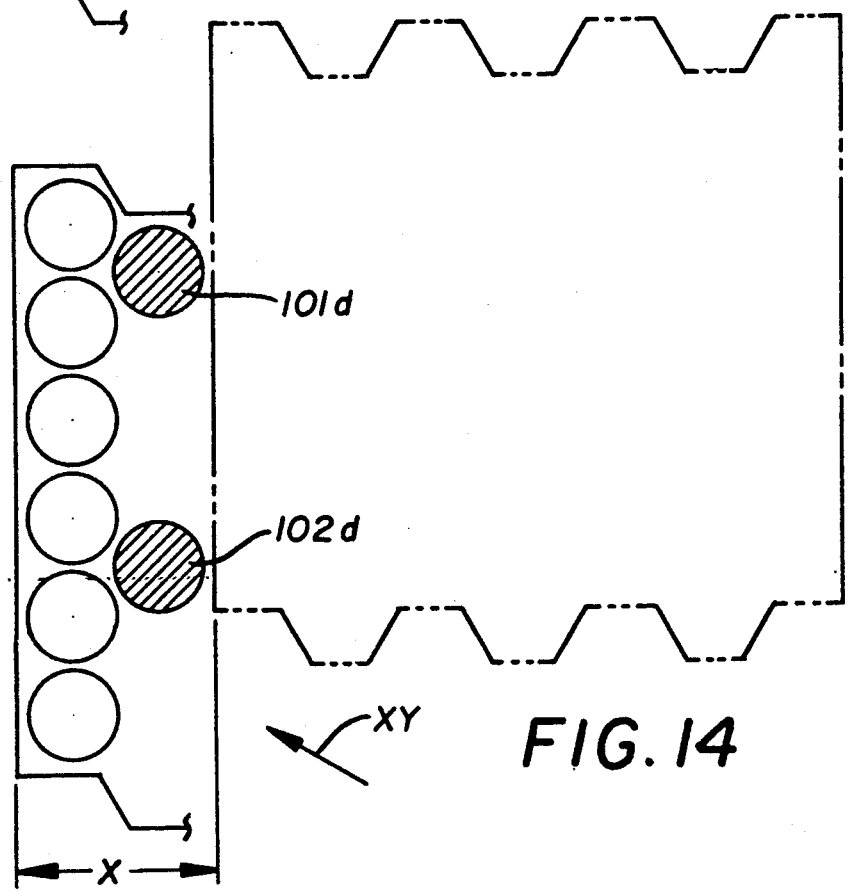

Referring to FIGS. 13 and 14, it will be seen that FIG. 13 is similar to FIG. 11 in that the sheet has been fed into the press first in the X direction and then "hits" have taken place with the sheet being indexed in the Y direction following the first two. Thus, in the example illustrated, the material in what may be called the first row has been exhausted.

At this time, by operating the servos simultaneously, the sheet can be moved in the XY direction to dispose material for the second row of "hits" into position beneath the two sets of press tooling as illustrated schematically at 101$d$ and 102$d$. It will be appreciated that when the material in the second row has been exhausted, a similar indexing at an opposite angle may take place and the operation may be continued until the sheet has been used up.

While a full and complete description of the invention has been set forth in accordance with the dictates of the Patent Statutes, it should be understood that modifications can be resorted to without departing from the spirit hereof or the scope of the appended claims.

Thus, it will be noted that servo drives have been described herein. However, other suitable programmable rotating or drive means could also be employed.

Furthermore, while reference has been made herein to utilization of the invention in connection with the forming of container ends, the invention is not intended to be limited in any way by the specific operations to be performed in the press. The enhanced material utilization made possible by the improved feeding method and apparatus has advantages in many fields and with many different types of material.

What is claimed is:

1. A method of feeding sheets of material from a stack of sheets to a work station comprising the steps of:
   (a) receiving a first sheet from the stack of sheets onto a loader;
   (b) aligning the loader with a feeder positioned between the loader and the work station and advancing the first sheet onto the feeder along a principal feed path;
   (c) advancing the first sheet a predetermined distance into the work station;
   (d) performing at least one operation on the first sheet;
   (e) moving the first sheet at an acute angle with respect to the principal feed path whereby the first sheet is simultaneously advanced further into the work station and laterally thereof, as required, between work station operations;
   (f) repeating steps c through e until the work station has performed its last operation on the first sheet;
   (g) receiving a second sheet from the stack of sheets onto the loader following step b;
   (h) repeating step b prior to performance of the work station of its last operation on the first sheet; and
   (i) repeating steps a through h as required.

2. The method of claim 1 further characterized by the employment of sheet engaging means on the feeder to urge said sheets into the work station and fully retracting said engaging means away from the work station following each incremental movement of a sheet into the work station.

3. A method of feeding sheets of material into a press comprising the steps of:
   (a) depositing a first sheet of material on a feeder disposed adjacent the press;
   (b) feeding the sheet into the press a predetermined distance in a first direction;
   (c) performing a press operation on the sheet;
   (d) moving the sheet either in a second direction at an acute angle with respect to said first and second directions;
   (e) depositing a second sheet on a loader positioned adjacent the feeder remote from the press and in alignment with the feeder and the press along the direction of feed while said first sheet is on said feeder;
   (f) repeating steps b through d until the press is ready to perform its last operation on said first sheet;
   (g) moving said loader in said second direction until said first and second sheets are in alignment in said first direction; and
   (h) simultaneously performing the last press operation on the first sheet while advancing the second sheet onto said feeder in said first direction.

* * * * *